United States Patent
Majewski et al.

(10) Patent No.: US 9,703,277 B2
(45) Date of Patent: Jul. 11, 2017

(54) METHOD AND APPARATUS TO TRACK CHANGES IN AN INDUSTRIAL CONTROLLER

(71) Applicant: Rockwell Automation Technologies, Inc., Mayfield Heights, OH (US)

(72) Inventors: Lorenzo Majewski, Waukesha, WI (US); Brian D. Szuter, Mayfield Heights, OH (US); Carol A. Knez, Mentor, OH (US); David Johnston, Mentor, OH (US); Bradley A. Lafuse, Willowick, OH (US); Douglas B. Sumerauer, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 569 days.

(21) Appl. No.: 14/271,665

(22) Filed: May 7, 2014

(65) Prior Publication Data
US 2015/0323914 A1     Nov. 12, 2015

(51) Int. Cl.
*G05B 19/042* (2006.01)
*G05B 15/02* (2006.01)

(52) U.S. Cl.
CPC ......... *G05B 15/02* (2013.01); *G05B 19/0426* (2013.01)

(58) Field of Classification Search
None
See application file for complete search history.

(56) References Cited

U.S. PATENT DOCUMENTS

| | | | |
|---|---|---|---|
| 7,123,974 B1 * | 10/2006 | Hamilton | G05B 19/4063 700/17 |
| 8,065,666 B2 * | 11/2011 | Schnabele | G05B 19/4183 717/127 |
| 8,584,096 B2 | 11/2013 | Schnabele et al. | |

(Continued)

FOREIGN PATENT DOCUMENTS

| EP | 2045676 A2 | 4/2009 |
|---|---|---|
| WO | 97/07443 | 2/1997 |

OTHER PUBLICATIONS

Invensys: FoxCTS (TM)—Change Tracking Software; Jan. 1, 2012, XP055217120—12 pages.

(Continued)

*Primary Examiner* — Isaac T Tecklu
(74) *Attorney, Agent, or Firm* — Boyle Fredrickson, SC

(57) ABSTRACT

A method and apparatus for tracking changes in an industrial controller is disclosed. A project for the industrial controller is developed that includes multiple components. Each of the components may be arranged at varying levels. Authorized personnel are able to access the components, or a portion thereof, within the industrial controller to change settings and or programming of the industrial controller. As each change is made, the industrial controller maintains a log of the changes. The change may initially be recorded in each module and/or at each level of the project. The change is then rolled up to a top level of the project. A revision log at the top level of the project stores each of the changes within the industrial controller. The industrial controller may then access the revision log to determine whether any action needs to be taken within the industrial controller.

19 Claims, 6 Drawing Sheets

(56) References Cited

U.S. PATENT DOCUMENTS

| | | | | |
|---|---|---|---|---|
| 2007/0093926 A1* | 4/2007 | Braun | ................. | G05B 19/042 |
| | | | | 700/112 |
| 2007/0208440 A1* | 9/2007 | Bliss | ................... | G05B 19/056 |
| | | | | 700/87 |
| 2008/0313228 A1* | 12/2008 | Clark | ................... | G05B 19/058 |
| 2011/0093098 A1* | 4/2011 | Kostadinov | ......... | G05B 19/042 |
| | | | | 700/87 |

OTHER PUBLICATIONS

Extended European Search Report dated Jul. 10, 2015; European Patent Application No. 15166604.7—9 pages.

* cited by examiner

METHOD AND APPARATUS TO TRACK CHANGES IN AN INDUSTRIAL CONTROLLER

BACKGROUND OF THE INVENTION

The subject matter disclosed herein relates generally to a method and apparatus for tracking changes in an industrial controller and, more specifically, to a system for tracking changes in each level of a project within an industrial controller, rolling those changes up to a top level of the project, and storing those changes within the industrial controller.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

Industrial controllers differ from conventional computers in a number of ways. Physically, they are constructed to be substantially more robust against shock and vibration and to better resist extreme environmental conditions than conventional computers. The processors and operating systems are optimized for real-time control and are programmed with languages designed to permit rapid development of control programs tailored to a constantly varying set of machine control or process control applications.

Generally, the industrial controllers have a highly modular architecture that allows, for example, different numbers and types of input and output modules to be used to connect the controller to the process or machinery to be controlled. This modularity is facilitated through the use of special "control networks" suitable for highly reliable and available real-time communication. Such control networks (for example, ControlNet, EtherNet/IP, or DeviceNet) differ from standard communication networks (e.g. Ethernet) by guaranteeing maximum communication delays by pre-scheduling the communication capacity of the network and/or providing redundant communication capabilities for high-avail ability. In addition, packets transmitted on the control network are formatted according to a protocol defined for the particular network, such as a Common Industrial Protocol (CIP).

As industrial processes grow in complexity, an increasing number of devices are being connected to the industrial controller. The modular architecture allows control modules to be distributed about a machine or along a process line. The increasing number of modules and distribution of these devices about the machine require more complex control programs. For example, a project may be defined for the controlled project. The project may include a control program executable on a primary processor module as well as one or more routines executable on remote modules. The control program on the primary processor may include a top level routine that schedules execution of and calls other routines executing on the primary processor as well as those routines executing on the remote modules. The project may also define certain operating parameters, such as a desired speed, pressure, temperature, etc. . . . at which the controlled process operates or certain configuration parameters, such as the number of inputs or outputs or type of network interface present, which define how each module operates.

In addition, the controlled machine or process may change over time. Additional modules may be added or existing modules may be upgraded. A different product may be manufactured or a different process followed to manufacture the same product. These changes to the hardware and/or controlled process may require changes and/or additions to the control program and/or parameters in the project. Designated personnel may connect to the industrial controller to make the required changes to the project, for example, via a remote server, a mobile computing device, or a local operator interface. However, certain industries, such as chemical or pharmaceutical manufacturers have established strict requirements regulating automated manufacturing processes in order to protect consumers of the products. Each change may require one or more validation procedures be executed to verify proper operation of a controlled process after making a change.

Presently, a control system operating in such an environment may include a supervisory system. The supervisory system may require users to log in and track changes to the project as they are made. The supervisory system may also provide notification to a user when changes are made. The supervisory system typically requires access at a predefined location. While this location may be close to the primary processor module, changes at remote modules may require a technician connecting a mobile computing device to the module at the remote location. Further, if personnel fail to follow procedure or are unaware of the proper procedure, they may connect directly to the primary processor module and make changes to the project without using the supervisory system. While the supervisory system may periodically upload the project (e.g., on a daily basis) and compare the project in the industrial controller to a copy of the project stored on the supervisory system, the potential exists for operation of the controlled machine or process to occur in the interim between making the change and the subsequent periodic verification. Thus, it would be desirable to provide an improved method and system for tracking changes in an industrial controller.

BRIEF DESCRIPTION OF THE INVENTION

The subject matter disclosed herein describes a method and apparatus for tracking changes in an industrial controller configured to operate an industrial control system. A program developer designs a project for the industrial controller. The project varies according to the application requirements but may include one or more of the following components: control program modules, operating parameters, and configuration settings. Each of the components may further be arranged at varying levels, for example, according to the configuration of modules within the control system and/or a calling structure for program modules. The program developer, a technician, or other authorized personnel may be able to access the components, or a portion thereof, within the industrial controller to change settings and or programming of the industrial controller. As each change is made, the industrial controller maintains a log of the changes. The log may record, for example, the personnel making the change, the time of the change, the program module, parameter, and/or setting being changed, as well as a prior version of the component being changed. The change may initially be recorded in each module in the control system and/or at each level of the project. The change is then rolled up to a top level of the project. The change may either be passed up through consecutively higher levels of the project or directly to the top level of the project. A revision log at the top level of the project stores each of the changes within the industrial controller. The industrial controller may then access the revision log to determine whether any action needs to be taken within the industrial controller, such as alerting an operator of a change or inhibiting operation of the control system until proper verification of the change has been made.

According to one embodiment of the invention, a method for tracking changes in a project in an industrial controller is disclosed. The project includes multiple components, and the industrial controller includes a memory device configured to store the components and instructions to control operation of an industrial machine or process. An identifier is received at the industrial controller, where the identifier corresponds to either a user or a remote device initiating a change in at least one of the components. Each change in the components is detected and recorded in the memory device. Along with each change, the identifier, and a time stamp corresponding to the change are also stored in the memory device in the industrial controller. Execution of the instructions in the industrial controller is restricted responsive to at least one of the changes.

According to another embodiment of the invention, a system for tracking a plurality of changes in a project in an industrial controller is disclosed. The project includes multiple components, and the industrial controller includes multiple modules. The system includes a top level module, selected from one of the modules, which, in turn, includes a clock circuit, a memory device, and a processor. The clock circuit is configured to generate a time stamp. The memory device is configured to store a revision log to contain each of the plurality of changes, at least one component of the project, and instructions. The processor is in communication with the memory device and configured to execute the instructions to receive an identifier at the top level module, detect each change in the plurality of components, and record each change, the identifier, and the time stamp corresponding to each change in the memory device. The processor is further configured to restrict execution of the plurality of instructions responsive to at least one of the changes.

According to yet another embodiment of the invention, a method for tracking changes in a project in an industrial controller is disclosed. The project includes multiple levels and each level includes at least one component. The industrial controller includes a memory device configured to store each of the components and to store instructions to control operation of an industrial machine or process. An identifier is received at the industrial controller, where the identifier corresponds to either a user or a remote device initiating a change in one of the components. Each change in the components at each level is detected, and each change occurring at a lower level in the project is transmitted to the highest level of the project. A logging module, executing at the highest level of the project, records each change, the identifier, and a time stamp corresponding to each change in the memory device in the industrial controller.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
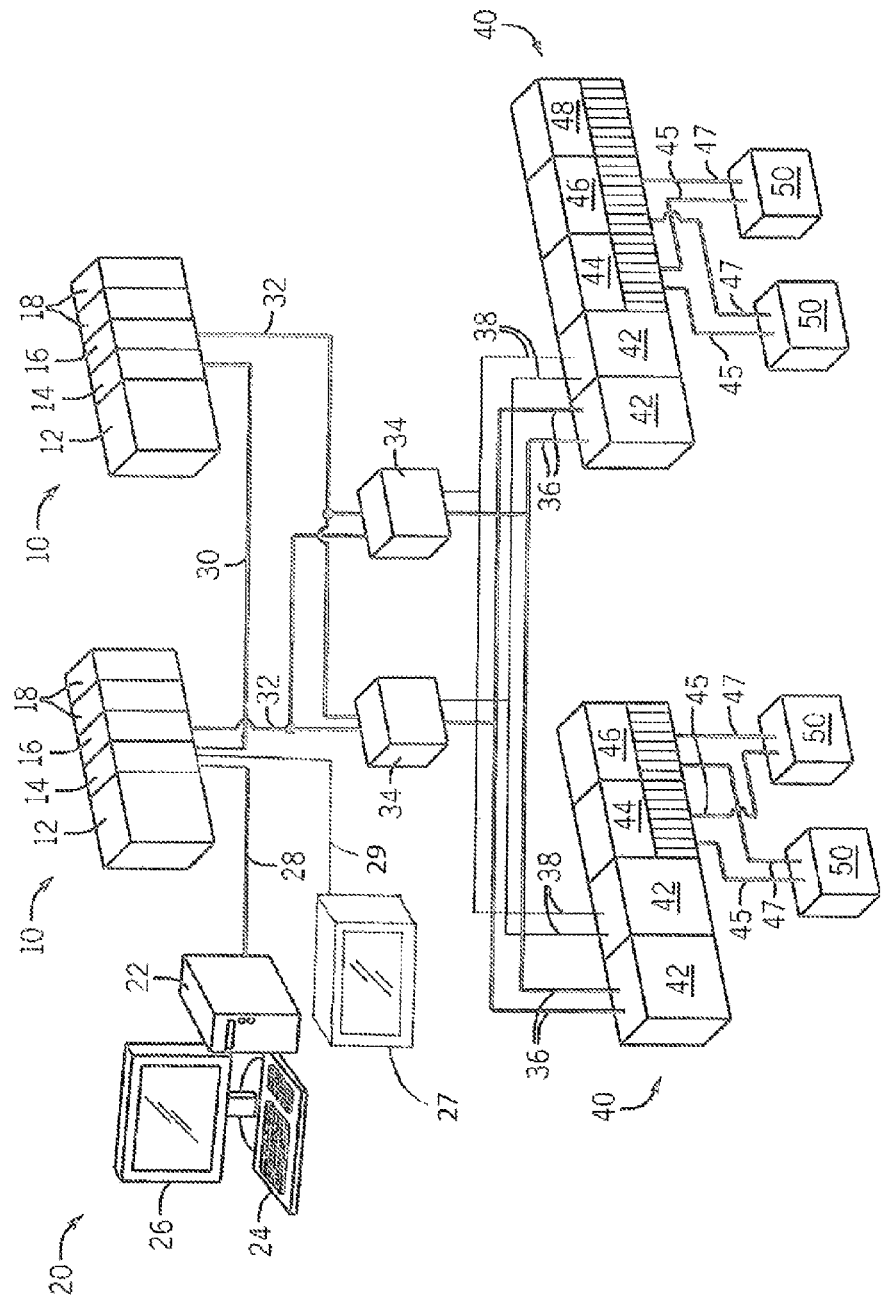
FIG. 1 is a schematic representation of one embodiment of an exemplary industrial control system incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Turning initially to FIG. 1, an exemplary industrial control system includes a pair of industrial controllers 10. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16. Each industrial controller 10 is further shown with two additional modules 18 that may be selected according to the application requirements and may be, for example, analog or digital input or output modules.

One or more operator interfaces 27 may be connected to the industrial control network. According to the illustrated embodiment, the operator interface 27 is an industrial computer with a touch-screen interface. An interface cable 29 connects the operator interface 27 to one of the industrial controllers 10. The interface cable 29 may be configured according to a standard specification for communications such as Ethernet or another serial protocol or it may be configured according to a proprietary specification corresponding to the operator interface 27 and/or the industrial controller 10. It is contemplated that the operator interface 27 may include other devices, either separately connectable or integrated into the chassis of the operator interface 27 including, but not limited to, a keyboard, touchpad, mouse, trackball, or a standard display device. The operator interface 27 further includes a memory device, processor, communication ports and other hardware components according to the system requirements. It is further contemplated that multiple display devices and/or multiple input devices may be distributed about the controlled machine or process and connected to one or more processing devices. The operator interface 27 may be used to display operating parameters and/or conditions of the controlled machine or process, receive commands from the operator, or change and/or load a control program or configuration parameters.

A supervisory system 20 may also be connected to the industrial control network. Each supervisory system 20 may include a processing device 22, input device 24, including, but not limited to, a keyboard, touchpad, mouse, trackball, or touch screen, and a display device 26. According to one embodiment of the invention, the supervisory system 20 is a server located either in a control cabinet proximate to the controlled machine or process or at a location remote from the controlled machine or process. Alternately, it is contemplated that each component of the supervisory system 20 may be incorporated into a single unit, such as a laptop or tablet computer. It is further contemplated that the supervisory system 20 may include multiple display devices 26 and/or multiple input devices 24 connected to one or more processing devices 22. An interface cable 28 connects the supervisory system 20 to one of the industrial controllers 10. The interface cable 28 may be configured according to a standard specification for communications such as Ethernet or another serial protocol or it may be configured according to a proprietary specification corresponding to the supervisory system 20 and/or the industrial controller 10. The supervisory system 20 may include one or more programs for communication with the industrial controllers 10. The programs may, for example, monitor operation of or permit program and/or configuration changes to the industrial controller 10 and the controller machine or process.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by a suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, or ControlNet. Each network module 16 and switch 34 is configured to communicate according to the protocol of the network to which it is connected and may be further configured to translate messages between two different network protocols.

Each remote rack 40 may be positioned at varying positions about the controlled machine or process. As illustrated, each remote rack 40 is modular and may be made up of numerous different modules connected together in a rack or mounted to a rail. Additional modules may be added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
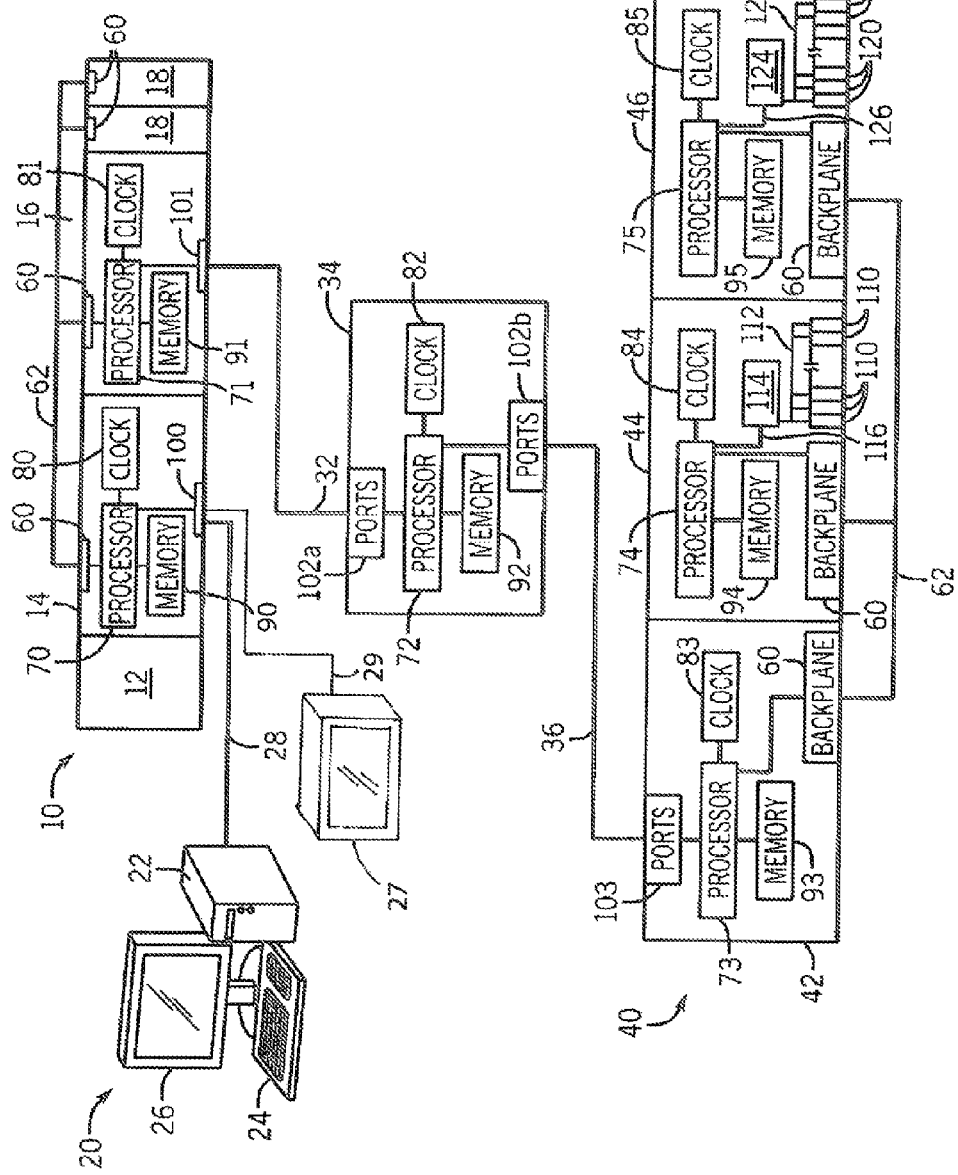
FIG. 2 is a block diagram representation of a portion of the industrial control system of FIG. 1.

Referring next to FIG. 2, a portion of the exemplary industrial control network of FIG. 1 is illustrated in block diagram form. Due to factors such as the increasingly distributed nature of the control network and the increasing capability and reduced cost of processing devices, it is contemplated that each of the nodes in the network may include a processor 70-75 and a memory device 90-95. The processors 70-75 are configured to execute instructions and to access or store operating data and/or configuration parameters stored in the corresponding memory device 90-95. The processors 70-75 may be any suitable processor according to the node requirements. It is contemplated that processors 70-75 may include a single processing device or multiple processing devices executing in parallel and may be implemented in separate electronic devices or incorporated on a single electronic device, such as a field programmable gate array (FPGA) or application specific integrated circuit (ASIC). Similarly, the memory devices 90-95 may be a single device, multiple devices or may be incorporated in part or in whole within the FPGA or ASIC. Each of the nodes may also include a clock circuit 80-85 configured to generate a time stamp corresponding to the present date and/or time, and each clock circuit 80-85 is preferably synchronized with the other clock circuits 80-85 according to for example, the IEEE-1588 clock synchronization standard. Communication between nodes mounted in the same rack or contained within a single housing occurs via a backplane 62 and a corresponding backplane connector 60. Nodes communicating via network media 28, 29, 32, 36 include ports 100-103 configured to process the corresponding network protocol. Each input module 44 includes input terminals 110 configured to receive the input signals 45 from the controlled devices 50. The input module 44 also includes any associated logic circuitry 114 and internal connections 112, 116 required to process and transfer the input signals 45 from the input terminals 110 to the processor 74. Similarly, each output module 46 includes output terminals 120 configured to transmit the output signals 47 to the controlled devices 50. The output module 46 also includes any associated logic circuitry 124 and internal connections 122, 126 required to process and transfer the output signals 47 from the processor 75 to the output terminals 120.

Figure 3:
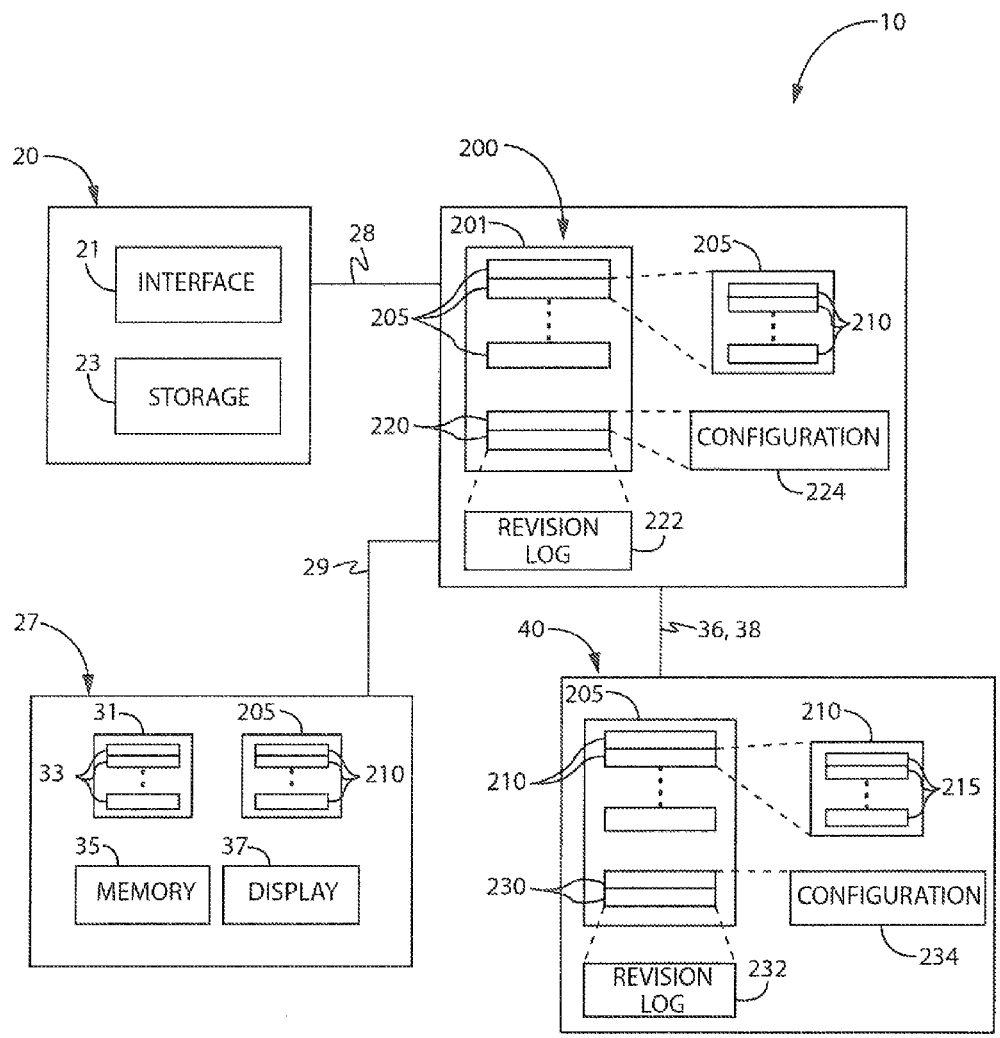
FIG. 3 is a block diagram representation of a project loaded into the industrial control system of FIG. 1.

Referring next to FIG. 3, operation of the control system and, by extension, the industrial controllers 10 and modules within the control system is defined by a project 200. The project 200 includes multiple components such as control programs as well as various parameters and settings for how the program and/or each module are configured to operate. An exemplary project 200 is illustrated in FIG. 3 in block diagram format with portions of the project 200 distributed between modules of the control system. A top level routine 201 of the project 200 may be assigned to one of the modules of the control system. As illustrated, the top level routine 201 is stored in one of the industrial controllers 10. According to one embodiment of the invention, the top level routine 201 may be stored in the processor module 14 of the industrial controller 10. The top level routine 201 may be, for example, an operating system, scheduler, or other routine configured to call a first level subroutine 205. Each of the first level subroutines 205 may be configured to execute a series of instructions, or a portion of the control program, to control operation of a section of, or a specific device within, the controlled machine or process. Further, each of the first level subroutines 205 may be configured to call one or more second level subroutines 210, where each of the second level subroutines 210 may similarly be configured to execute a series of instructions, or a portion of the control program, to control operation of a section of, or a specific device within, the controlled machine or process. It is contemplated that the top level routine 201 as well as one or more first or second level subroutines 205, 210 may each execute in the processor module 14. Further, one or more first or second level subroutines 205, 210 may each execute in one of the additional modules 18 included in the industrial controller 10. Similarly, one or more first or second level subroutines 205, 210 may each execute in one of the remote racks 40 distributed about the controlled machine or process. Each of the top level routine 201, first level subroutine 205, and second level subroutine 210 interfaces with the other routines either directly, for example, via shared memory in a single processor module 14 or indirectly via a backplane 62 or network connection 36, 38 and associated ports and/or connectors. Various other configurations and distributions of the routines within the modules of the control system are contemplated without deviating from the scope of the invention.

The top level routine 201 may also allocate a portion of the memory device 90-95 within each module to store data structures 220 used by the project 200. According to the illustrated embodiment, a first data structure 220 may be defined for a revision log 222. The revision log 222 is configured to store a history of each change made to the project 200 within the industrial controller 10. A second data structure 220 may be defined to store configuration parameters 224. The configuration parameters 224 define, for example, how the module operates. For example, a module may include a slot to receive a network interface card. Different network interface cards may be provided for different networks, such as, Ethernet/IP, DeviceNet, or ControlNet and require different settings. The configuration parameters 224 may define, first, which network interface card is present in the slot and, second, parameters defining how the module communicates on the network. As is understood in the art, numerous other configuration parameters may be included to define how different modules included in the industrial controller 10 operate. Still other data structures 220 may be defined to allocate portions of the memory device 90 for other data such as input/output (I/O) tables, variable names, tags, operating parameters, and the like. Similarly, the first level routines 205 may also allocate a portion of the memory device 90-95 within the module to store additional data structures 230 used by the project 200. The additional data structures 230 may define, for example, a local revision log 232 in a lower level module, where the local revision log 232 may be configured to store changes made in the lower level module. The additional data structures 230 may also define configuration parameters 234 for the lower level module.

It is further contemplated that a portion of the project 200 may be distributed, for example, to an operator interface 27. According to the illustrated embodiment, the operator interface 27 includes a separate project 31 configured to execute independent routines 33 as well as a first level routine 205 executing on a processing device within the operator interface 27. The first level routine 205 may, for example, be configured to provide a visual indication of the revision log on the display 37 of the operator interface. According to another embodiment of the invention, the project 31 for the operator interface may be configured to communicate with the industrial controller 10 to retrieve the revision log 222 and to provide the visual indication of the revision log 222 on the display 37.

In operation, the project 200 is configured to track each change made to the project 200 and to store the changes in a revision log 222 within the industrial controller 10. A user may log on and/or connect to the industrial controller 10 via one of several options. The supervisory system 20 includes one or more programs stored in memory or other non-transitory storage 23 and configured to execute on the processing device 22. One of the programs may be an interface 21 between the supervisory system 20 and the project 200. It is contemplated that the interface 21 may integrate with one or more other programs on the supervisory system to execute a portion of the steps described below or, alternately, the interface 21 may be a self-contained program configured to execute each of the steps. The supervisory system 20 may provide a prompt on the display device 26 for a user to enter an identifier, such as a user name, and a password for a secure log-in. Optionally, the identifier may correspond to the device connecting to the industrial controller 10. The supervisory system 20 may also be configured to restrict or allow access to one or more components of the project 200 and/or restrict or allow the operations (e.g., read or write) to be performed on each of the accessible components as a function of the user identifier or password entered. Similarly, the user may log on and/or connect to the industrial controller 10 using the operator interface 27 or using a mobile computing device, such as a laptop, notebook, or tablet computer. For convenience, operation of the system will be discussed with respect to the supervisory system 20. However, this is not intended to be limiting and similar operation may occur if a user accesses the project 200 via an operator interface 27, a mobile computing device connected directly to the industrial controller 10, or via other devices.

Figure 4:
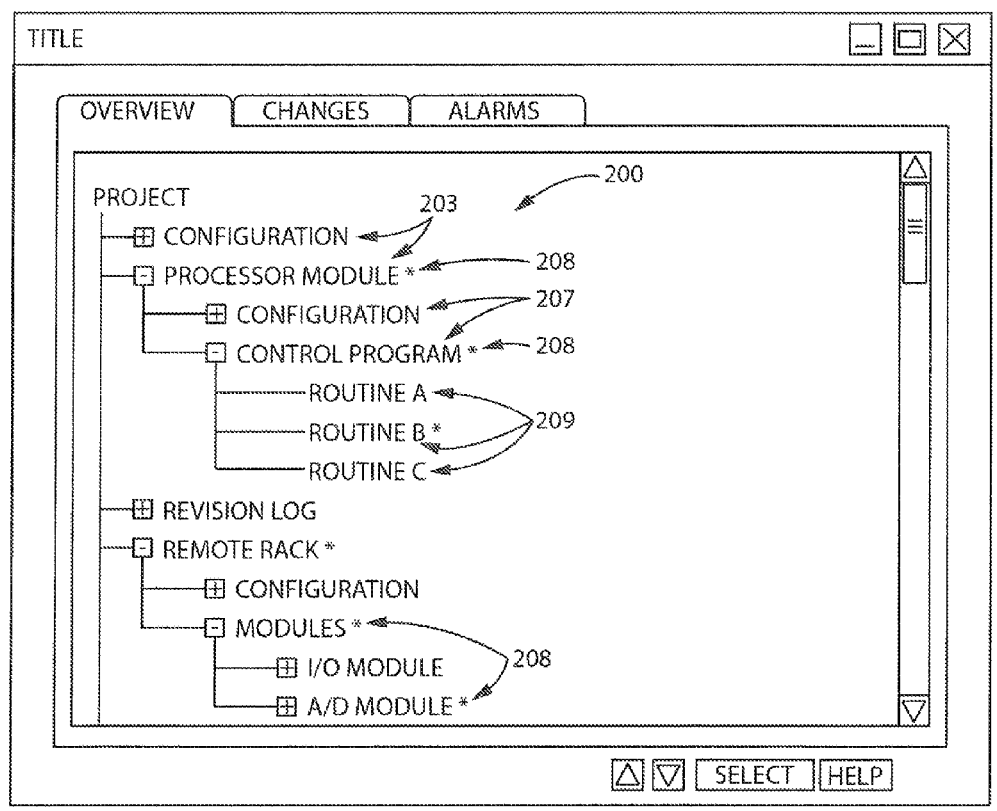
FIG. 4 is one exemplary screen shot of a routine providing a visual indication of a project according to one embodiment of the invention.

With reference to FIG. 4, an exemplary overview of the project 200 may be provided to the user on the display device 26 of the supervisory system 20. According to the illustrated embodiment, the project 200 is displayed in "tree" form. Top level components 203 include, for example, configuration parameters for the project 200 configuration of the processor module, revision log and each of the remote racks 40. Top level components 203 may be expanded to display second level components 207, which, in turn, may be expanded to display third level components 209. It is contemplated that the project 200 may include various numbers and levels of components, including, for example, all top level components 203 or additional levels of lower level components. The overview further includes a visual indicator 208 identifying where a change occurred in the project 200. When connecting to the industrial controller 10, the supervisory system 20 may upload the revision log 222 and identify changes made to the project 200. According to the illustrated embodiment, an asterisk is placed next to components that have changed and/or higher level components that have had changes made in sub-level components. The visual indicator 208 may be any visual cue, such as alternative symbols and/or highlighting of a component. The visual indicator 208 allows a user to quickly identify where changes have been made in the project 200. The visual indicator may be removed or changed to a second visual indicator once a change has been verified. It is further contemplated that the project 200 may be displayed in various other formats without deviating from the scope of the invention, including, but not limited to, a block diagram, a schematic diagram, or as objects.

After receiving the identifier from the supervisory system 20, the industrial controller 10 determines which components may be changed as a function of the identifier. The components that may be changed may be presented exclusively on the overview of the project 200 while those components to which the user does not have access may be hidden from display. Optionally, the components that may be accessed by the user may be displayed in a first color or highlighted while the components that are restricted may be displayed in a second color or grayed out on the display. The user may navigate via the overview screen to specific settings and/or control programs to manually enter changes to the components in the project 200. Optionally, the user may have previously entered changes to the components, for example, in a copy of the project 200 on a remote computer. The changes may be transferred to a removable medium such as a disc, universal serial bus (USB) drive, secure digital (SD) card, or other such media. The removable medium may then be inserted into the device connected to the industrial controller 10 or loaded on to a mobile computing device connectable to the industrial controller 10.

As each change is made, either manually or as it is loaded into the industrial controller 10, the industrial controller 10 makes a record of the change. Referring again to FIGS. 2 and 3, each of the changes is stored in the revision log 222 of the industrial controller 10. It is also contemplated that each module includes a local revision log 232 that stores changes made to that module. Each change is detected by the processor 71-75 in the module and a record of the change is stored in the local revision log 232. The processor 71-75 then passes the change back up to the top level routine 201. It is contemplated that a record of the change may be communicated directly to the top level routine 201 or passed up through subsequent layers in the project 200. The top level routine 201 records all changes to the project 200 in the top level revision log 222. Alternately, no local revision log 232 is included in a module and the processor 71-75 detects the change and passes a record of the change back up to the top level routine 201 without recording changes at the local level. According to still another embodiment of the invention, the changes may be detected, for example, by the processor module 14. The processor module 14 may be in communication with the supervisory system 20 and receive a message packet including a change. The change may be stored in the revision log 222 and transmitted to the module affected by the change.

Figure 5:
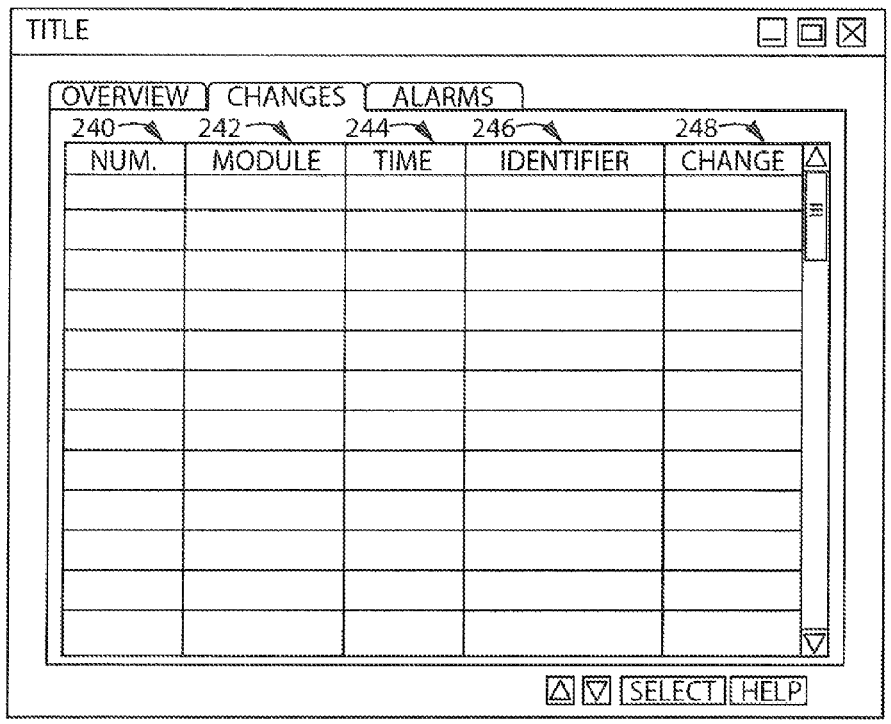
FIG. 5 is another exemplary screen shot of a routine providing a visual indication of changes made in a project according to one embodiment of the invention.

The record provides the user an indication of the details of the change and in what module of the control system and/or component of the project 200 the change was made. Referring to FIG. 5, a screen may be provided on the display 26 of the supervisory system 20 that displays the contents of the revision log 222. Either upon entry to the screen or at a periodic interval, the supervisory system 20 may retrieve a copy of the revision log 222 for subsequent display. According to the illustrated embodiment, the revision log 222 includes a number 240 incremented for and identifying each change. The revision log 222 stores a module identifier 242 corresponding to the module in which the change was made and a time stamp 244 corresponding to the time at which the change was made. The time stamp 244 is generated by the clock circuit 80-85 within the respective module and may include a time and/or date on which the change was made. The revision log 222 further stores the identifier 246 provided to the industrial controller 10 that corresponds to the user and/or the remote device that made the change and also stores the change record 248 including the details of the change. According to one embodiment of the invention, the change record 248 stores a prior value and a new value of the component that was modified. For example, if an operating parameter or configuration setting is changed, the prior value as well as the new value is stored, if one of the routines in the control program is changed, a prior listing as well as the new listing of the rung, or other portion, of the program that was changed may be stored. Optionally, the change record 248 may include a rung number or other identifier corresponding to a location of the change. According to other embodiments of the invention, the revision log 222 may include still other elements of the component and/or module being changed. Optionally, the revision log 222 may include only a portion of the elements shown in the illustrated embodiment. According to still another aspect of the invention, the revision log 222 may include various combinations of data for each change as a function of the module and/or component being changed. Although changes made to the project 200 are discussed above with respect to a connection to the industrial controller 10, it is contemplated that the changes may be made via connections to other modules via the network or via direct connection according to the configuration of the respective module.

Figure 7:
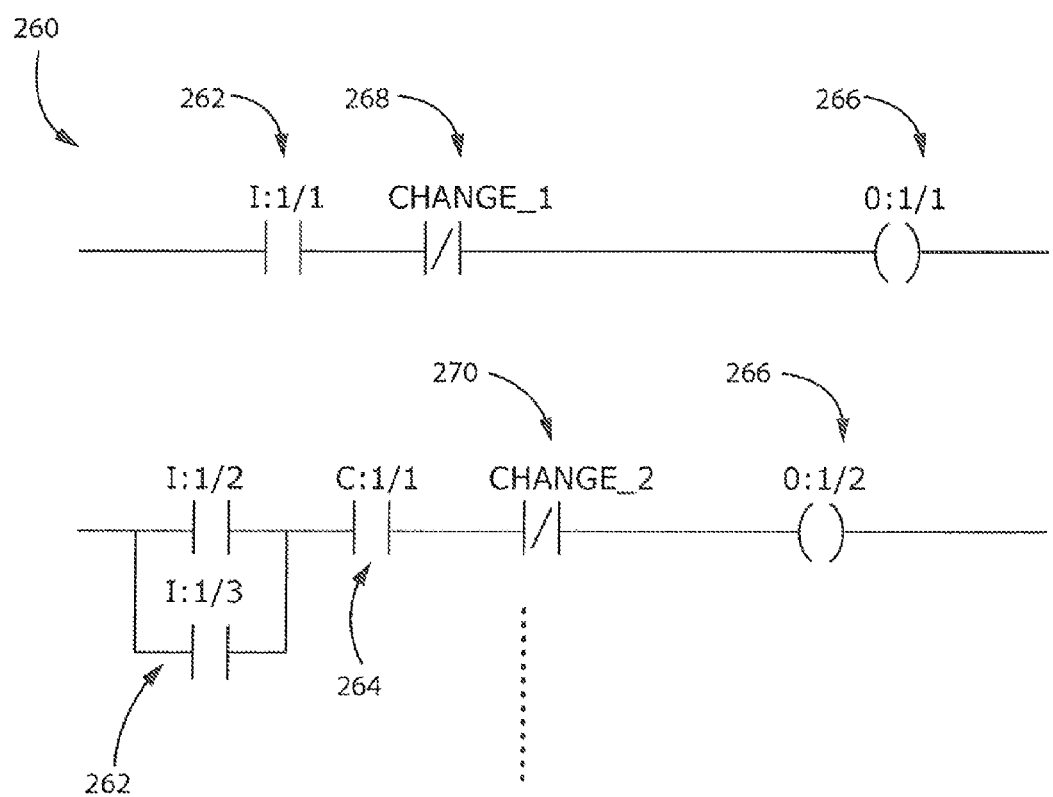
FIG. 7 is an illustration of ladder logic for controlling operation of the industrial controller according to one embodiment of the invention.

Because the revision log 222 is stored in the industrial controller 10, the industrial controller 10 may be configured to take action responsive to changes in the project 200. With reference to FIG. 7, one or more tags 268, 270 may be defined that identify a memory address in the industrial controller 10 that may be set or reset as a function of the industrial controller 10 detecting changes in the project 200. As illustrated, a first change tag 268 and a second change tag 270 have been defined. The first change tag 268 may be set, for example, if changes occur at one level of the project 200 or in one module of the control system, and the second change tag 270 may be set, for example, if changes occur at a different level of the project 200 or in another module of the control system. Optionally, a single change tag may be defined and set/reset based on any change in the project 200. Still other numbers of change tags may be defined according to the application requirements. As illustrated in FIG. 7, a control program 260 monitors various addresses defined in the industrial controller 10. The addresses may be defined in the data structures 220, such as locations in an input table 262 or in a counter table 264. The control program 260 sets addresses in an output table 266 as a function of the monitored addresses and according to the logic defined in each rung of the control program 260. A first change tag 268 is defined in the first rung and associated with a normally closed contact. If the first change tag 268 is off, indicating no changes were made, the rung may execute normally; however, if the first change tag 268 is on, indicating changes have been made, execution of the rung is prevented.

Figure 6:
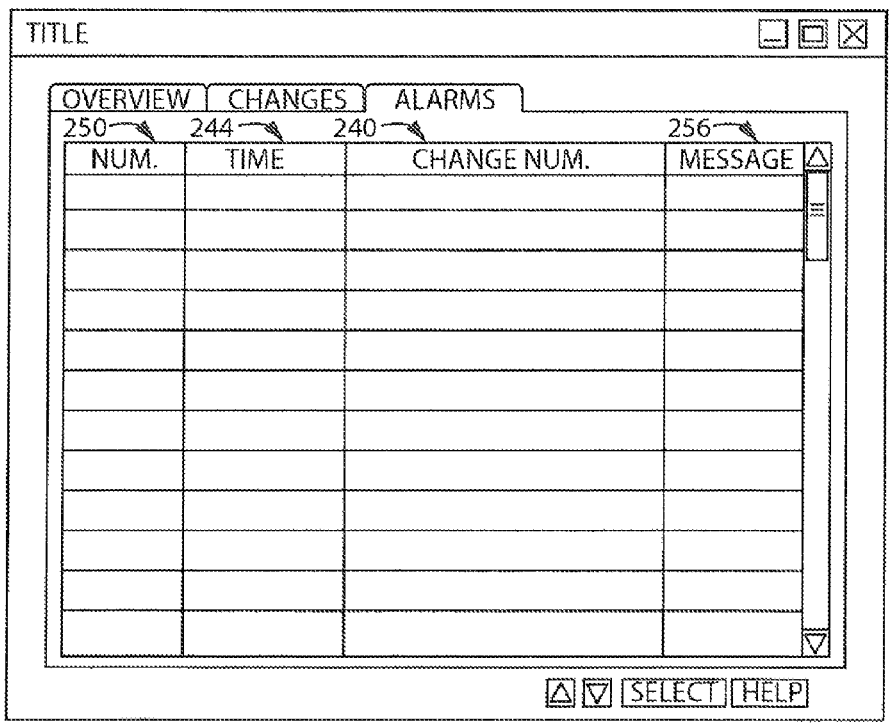
FIG. 6 is an exemplary screen shot of a routine providing a visual indication of actions taken as a result of changes made in a project according to one embodiment of the invention.

The industrial controller 10 may similarly be configured to generate a message to a user indicating a change has occurred. As previously discussed, when a change is detected the industrial controller 10 may store a time stamp 244 and assign a number 240 identifying the detected change. With reference also to FIG. 6, if the industrial controller 10 generates a message responsive to the change, the message may be assigned a number 250 identifying the message. According to the illustrated embodiment, the time stamp 244 and change number 240 may be stored along with the message date 256 which provides an indication to the user that a change and/or which change occurred. The data is stored in the industrial controller 10 but may be retrieved by an external device, such as the supervisory system 20, and presented on the display 26 to a user.

After the industrial controller 10 has detected a change, it may keep the change tag 268, 270 set until a predefined sequence of events occurs. It is contemplated that various events may be configured to reset the change 268, 270 according to the application requirements. According to one example, the industrial controller 10 may require a specific identifier be associated with either a particular user or remote device that is authorized to accept a change. Optionally, the industrial controller 10 may require execution of a certain component of the project 200, such as a verification run, to make sure that the changes to the project 200 do not impact operation of the controlled machine or process. Once the industrial controller 10 has detected the predefined sequence of events to verify that a change is acceptable, it again allows execution of the control program. Because the revision log 222 is stored in the industrial controller 10, it allows the industrial controller 10 to detect changes and to prevent execution of the project 200 until appropriate verification of the changes have been made, helping to prevent undesired or inadvertent changes to impact execution of the controller machine or process.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A method for tracking changes in a project in an industrial controller, wherein the project includes a plurality of components and wherein the industrial controller includes a memory device configured to store the plurality of components and a plurality of instructions to control operation of an industrial machine or process, the method comprising the steps of:
  receiving an identifier at the industrial controller, wherein the identifier corresponds to one of a user or a remote device initiating a change in at least one of the plurality of components;
  detecting each change in the plurality of components;
  recording each change, the identifier, and a time stamp corresponding to each change in the memory device in the industrial controller; and
  restricting execution of at least a portion of the series of instructions to control operation of the industrial machine or process in the industrial controller responsive to at least one of the changes, wherein execution of a first portion of the series of instructions is restricted responsive to a first change, execution of a second portion of the series of instructions is restricted responsive to a second change, and the first portion of the series of instructions is different than the second portion of the series of instructions.

2. The method of claim 1 wherein the step of restricting execution of at least a portion of the series of instructions to control operation of the industrial machine or process in the industrial controller further comprises the steps of:
  defining a first tag and a second tag, each of the first and second tags are configured to be stored in the memory device and to be readable by the plurality of instructions; and
  inserting a first interlock in the first portion of the series of instructions as a function of the first tag; and
  inserting a second interlock in the second portion of the series of instructions as a function of the second tag.

3. The method of claim 1 wherein the plurality of components includes at least one of a program module, an operating parameter, and a configuration setting.

4. The method of claim 1 wherein the plurality of components has a defined hierarchy including at least two levels, wherein each change in a lower level is transferred up to a top level of the project.

5. The method of claim 1 further comprising the step of displaying a visual indication of each change on a display connected to one of the industrial controller and the remote device.

6. The method of claim 1 further comprising the step of maintaining the restricted execution until the change is verified.

7. A system for tracking a plurality of changes in a project in an industrial controller, wherein the project includes a plurality of components and the industrial controller includes a plurality of modules, the system comprising a top level module, selected from one of the plurality of modules, wherein the top level module includes:
  a clock circuit configured to generate a time stamp;
  a memory device configured to store:
    a revision log for storing each of the plurality of changes,
    at least one component of the project, and
    a plurality of instructions; and
  a processor in communication with the memory device and configured to execute the plurality of instructions to:
    receive an identifier at the top level module, wherein the identifier corresponds to one of a user or a remote device initiating a change in at least one of the plurality of components,
    detect each change in the plurality of components,
    record each change, the identifier, and the time stamp corresponding to each change in the memory device, and
    restrict execution of at least a portion of the plurality of instructions responsive to at least one of the changes, wherein execution of a first portion of the plurality of instructions is restricted responsive to a first change, execution of a second portion of the plurality of instructions is restricted responsive to a second change, and the first portion of the series of instructions is different than the second portion of the series of instructions.

8. The system of claim 7 further comprising at least one lower level module in communication with the top level module, wherein the lower level module includes:
  a clock circuit configured to generate a time stamp;
  a memory device configured to store:
    at least one component of the project, and
    a plurality of instructions; and a processor in communication with the memory device and configured to execute the plurality of instructions to:
  detect each local change made in the lower level module, and
  transmit a record of the local change to the top level module.

9. The system of claim 8 wherein the memory device of the low level module is further configured to store a local revision log for storing each local change and wherein the processor of the lower level module is further configured to record each local change and the time stamp corresponding to each local change in the memory device of the lower level module.

10. The system of claim 7 wherein at least one tag readable by the plurality of instructions is defined and wherein the processor is further configured to set a value for the tag responsive to detecting at least one of the changes and to restrict execution of at least a portion of the plurality of instructions as a function of the tag.

11. The system of claim 7 wherein the plurality of components includes at least one of a program module, an operating parameter, and a configuration setting.

12. The system of claim 7 further comprising at least one remote device in communication with the top level module, wherein the remote device is configured to receive the plurality of changes.

13. The system of claim 12 wherein the remote device is selected from one of a supervisory system, programming interface, and an operator interface.

14. A method for tracking changes in a project in an industrial controller, wherein the project includes a plurality of levels and each level includes at least one component and wherein the industrial controller includes a memory device configured to store each of the components and a plurality of instructions to control operation of an industrial machine or process, the method comprising the steps of:
  receiving an identifier at the industrial controller, wherein the identifier corresponds to one of a user or a remote device initiating a change in at least one of the plurality of components;
  detecting each change at each level in the plurality of components;
  transmitting each change occurring at a lower level in the project to the top level of the project; and
  executing a logging module at the top level of the project to record each change, the identifier, and a time stamp corresponding to each change in the memory device in the industrial controller.

15. The method of claim 14 further comprising the step of restricting execution of the series of instructions in the industrial controller responsive to at least one of the changes.

16. The method of claim 15 wherein the step of restricting execution of the series of instructions in the industrial controller further comprises the steps of:
  defining a tag readable by the plurality of instructions and configured to be set responsive to detecting each change; and
  inserting an interlock in the series of instructions as a function of the tag.

17. The method of claim 15 further comprising the step of maintaining the restricted execution until the change is verified.

18. The method of claim 14 wherein the plurality of components includes at least one of a program module, an operating parameter, and a configuration setting.

19. The method of claim 14 further comprising the step of displaying a visual indication of each change on a display connected to one of the industrial controller and the remote device.

* * * * *

UNITED STATES PATENT AND TRADEMARK OFFICE
CERTIFICATE OF CORRECTION

PATENT NO. : 9,703,277 B2
APPLICATION NO. : 14/271665
DATED : July 11, 2017
INVENTOR(S) : Majewski et al.

Page 1 of 1

It is certified that error appears in the above-identified patent and that said Letters Patent is hereby corrected as shown below:

In the Claims

Claim 9, Column 13, Line 9, Replace "low" with "lower".

Signed and Sealed this
Twenty-eighth Day of November, 2017

Joseph Matal
*Performing the Functions and Duties of the
Under Secretary of Commerce for Intellectual Property and
Director of the United States Patent and Trademark Office*